(12) United States Patent
Dumitriu

(10) Patent No.: US 6,477,310 B1
(45) Date of Patent: Nov. 5, 2002

(54) STRIPPING OPTICAL FIBERS

(75) Inventor: Ion Dumitriu, Nynäshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 108 days.

(21) Appl. No.: 09/751,402

(22) Filed: Jan. 2, 2001

Related U.S. Application Data

(63) Continuation of application No. PCT/SE99/01166, filed on Jun. 29, 1999.

(30) Foreign Application Priority Data

Jul. 3, 1998 (SE) .............................................. 9802399

(51) Int. Cl.$^7$ .............................................. G02B 6/00
(52) U.S. Cl. ........................... 385/147; 81/9.4; 81/9.41; 81/9.51
(58) Field of Search ............................. 385/147; 81/9.4, 81/9.41, 9.42, 9.51

(56) References Cited

U.S. PATENT DOCUMENTS

| | | | |
|---|---|---|---|
| 5,361,384 A | * 11/1994 | Stepan | 385/147 |
| 5,893,302 A | * 4/1999 | Strom | 81/9.41 |
| 5,946,986 A | * 9/1999 | Dodge et al. | 81/9.41 |
| 6,321,621 B1 | * 11/2001 | Stepan | 81/9.51 |

FOREIGN PATENT DOCUMENTS

| | | |
|---|---|---|
| DE | 42 03 995 A1 | 8/1993 |
| DE | 42 27 041 A1 | 2/1994 |
| EP | 0 710 858 A1 | 5/1996 |

* cited by examiner

*Primary Examiner*—Brian Sircus
*Assistant Examiner*—Brian S. Webb
(74) *Attorney, Agent, or Firm*—Nixon & Vanderhye, P.C.

(57) ABSTRACT

When stripping an optical fiber ribbon (7) from its polymer coating the ribbon is clamped at some distance from its end in a cutting and tension unit (3). When the lid (23) of this unit is folded down knifes are pressed into the coating at a side of the unit. The end portion of the ribbon (7) is then clamped in a heating unit (1) which before this clamping operation is moved, against the force from an elastically biased rod (31) extending from the cutting and tension unit, the movement being guided by guide rods (11), to be located directly at the side of the cutting and tension unit (3). The end of the ribbon in the heating unit is heated by a heating plate (5). When the end has become sufficiently hot and the coating is softened, the cutting and tension unit (3) automatically starts to move away from the heating unit (1) by the action of the elastically biased rod (31). Then the knifes start to separate the coating on the end portion from the rest of ribbon. The elastic force acts only to start the stripping movement, which is then fulfilled by manually pulling the units away from each other. The elastically biased rod (31) does not form any obstacle to this further movement since it acts with a free end surface at an opposite surface of the heating unit (1). By the elastic force the stripping operation is started at the right moment so that the end is soft enough but is not overheated.

4 Claims, 3 Drawing Sheets

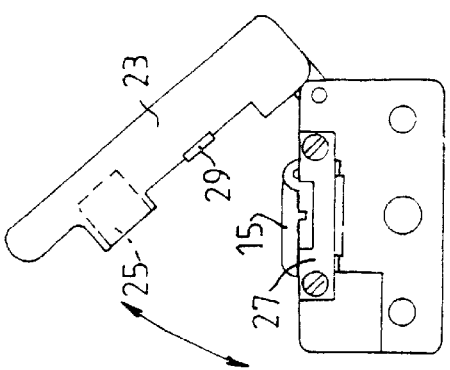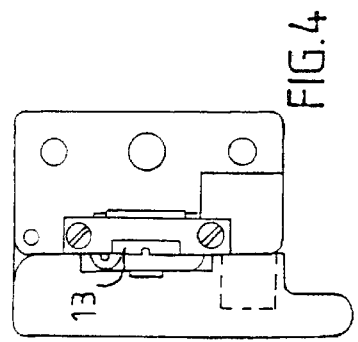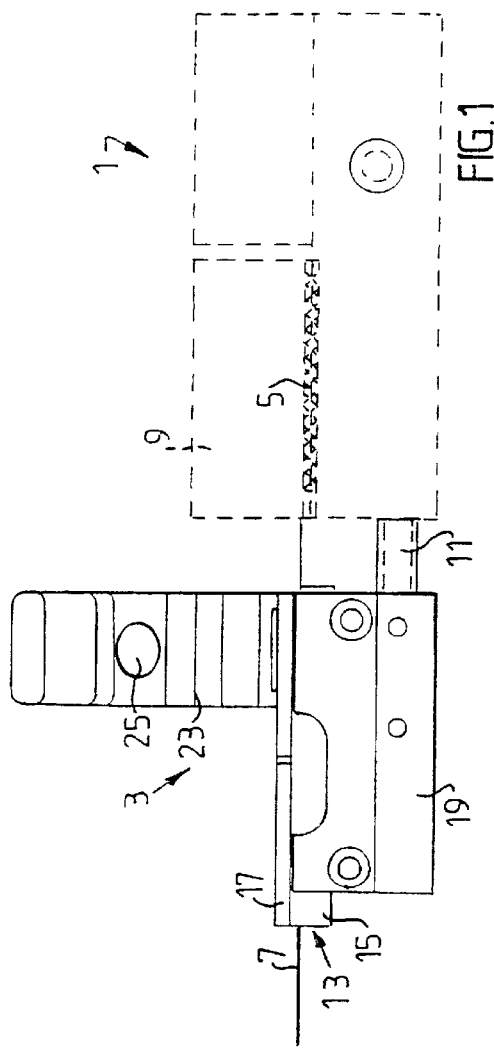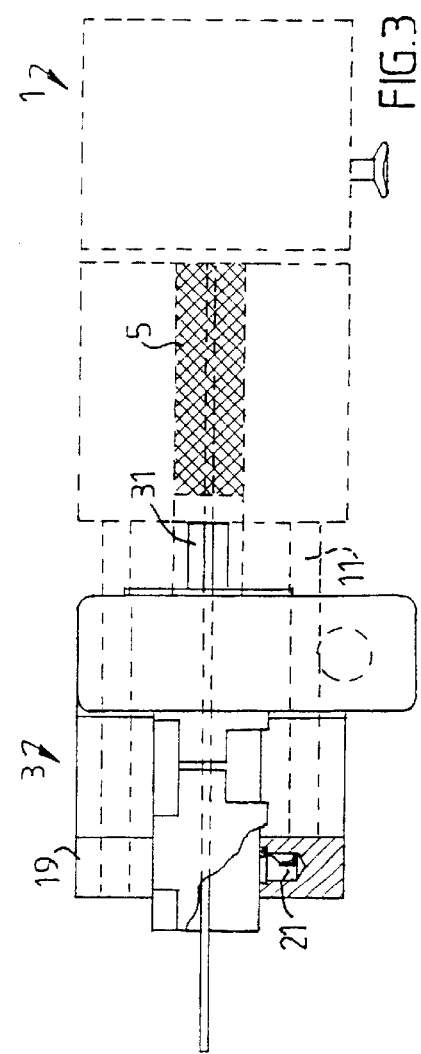

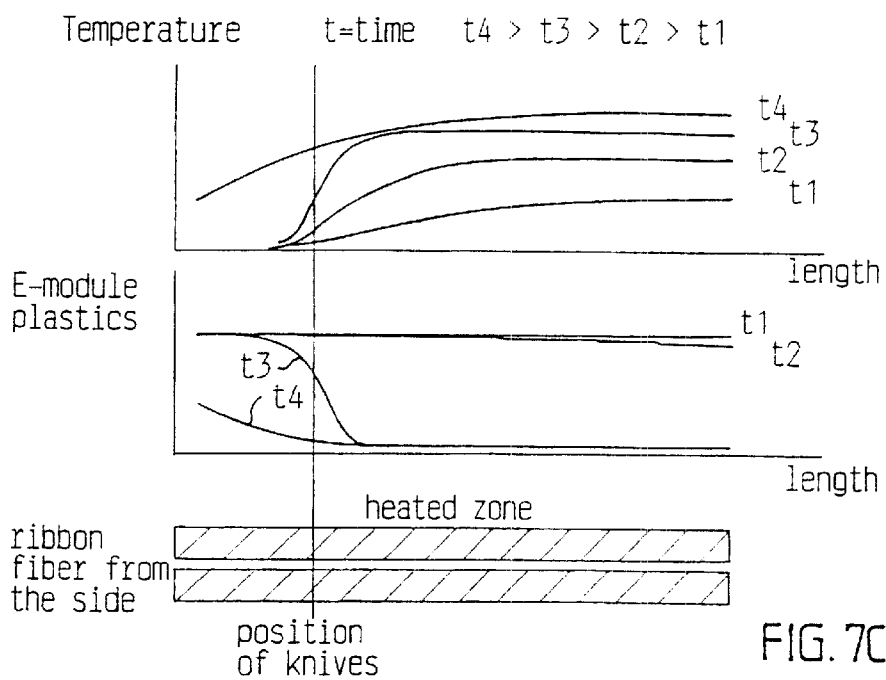

STRIPPING OPTICAL FIBERS

This application is a continuation of PCT/SE99/01166 filed on Jun. 29, 1999.

TECHNICAL FIELD

The present invention relates to stripping optical fibers and in particular to a device for stripping optical fiber ribbons.

BACKGROUND

Optical fibers are presently widely used for communicating information such as in large telecommunication systems, primarily owing to their large reliability, their insensitivity to electrical interference and their high capacity. In order to facilitate handling optical fibers, they are often provided as fiber ribbons, in which a plurality of optical fibres are located adjacent to each other, optically isolated from each other and from the environment, but in some manner fixed in parallel to each other, for example by means of a polymer coating. Such a ribbon usually contains 4, 6, 8 or 12 parallel fibers.

When splicing two different fibers, which is usually performed by welding, the polymer coatings of the fibers must first be removed. Thus, both the individual coating of the fibers and the material, which secures the fibers to each other to form a fiber ribbon, must be removed. Thereupon the uncovered fibres are cut in order to thereafter be welded together.

In order to strip the coatings, the entire fiber ribbon is first heated, see for example the fiber tool disclosed in Swedish patent application 9103492-6. This heating softens the coatings resulting in a reduction of friction forces which are to be overcome when stripping the fibers. Thereafter the primary coating is removed by means of two blades having opposite edges, which pinch the fiber ribbon at a location about 35–50 mm from an end thereof. Then a tensional force is applied to the end of the fiber ribbon, which results in mainly two possible outcomes:

1. The coating is pulled away in the shape of a complete polymer part or sleeve.
2. The coating is scraped away forming small particles which can adhere to various objects such as the stripped fiber ends.

The first of these two cases is of course desirable. If the fiber ribbon when being heated is made too soft, i.e. the fiber ribbon end is subjected to a too high temperature during a too long time period, the fiber ribbon is easily deformed and then the very elastic coating is torn to pieces, which also is undesirable. Thus, in order to perform a satisfactory stripping operation, the ribbon fiber end should be subjected to an adequate temperature during a suitable time period. Usually, the temperature and the time period are set by making a plurality of stripping tests for each new type of fiber ribbon, which is to stripped and spliced. It even turns out that for many fiber types it is very difficult for find suitable stripping parameters and in any case a lot of testing work is required. This is of course time consuming and thus some method would be searched for in order to reduce the effort in setting the correct parameter values.

SUMMARY

It is an object of the invention to provide a method and device for stripping an optical fiber which can in a reliable and reproducible way remove coatings from in particular optical fiber ribbons without making any extensive testing of the adhesion of the coating.

Generally an optical fiber and in particular a fiber ribbon is stripped from a polymer coating by first determining a first end portion of the fiber to be rid of the coating. Then the fiber is clamped at a second portion adjacent the first portion in a cutting and tension unit. In the clamping operation knifes are pressed into the polymer coating at a position between the first and second regions. Thereupon the first portion is clamped and heated in a heating unit. Finally the cutting and tension unit is moved away from the heating device and then the knifes separate the coating on the first portion from the rest of fiber. An empty polymer sleeve is left in the heating device. When starting to move the cutting and tension unit it is not affected by any manual force but only by an elastic predetermined force derived from a spring. The predetermined force has a direction so that it acts to separate the heating unit and cutting and tension unit from each other. After the start of the movement, the movement is fulfilled by manually pulling the two units apart.

Linear guide means are arranged to guide the units in movements towards and away from each other. The spring is provided as an elastic means which thus acts to move the units away from each other and preferably acts on a first one of the units. The elastic means is thus only active to start the movement of the units from each other and only up to a position, in which there is a rather small, predetermined distance between the units. The elastic means acts freely meaning that it allows that the units are separated from each other by more than the first distance, not making any obstacle to this movement, when there is no elastic action. The elastic means can comprise an elastically biased rod in one of the units and then this rod acts with an end surface freely on a surface of the first unit. The guide means can then comprise cylindrical guide rods which are attached to and extend from one of the units into corresponding bores made in the other one of the units and which are parallel to the spring-loaded rod.

BRIEF DESCRIPTION OF THE DRAWINGS

The invention will now be described in detail by way of a non-limiting embodiment with reference to the accompanying drawings, in which:

FIG. 1 is a side view of a device for stripping optical fibers, in particular fiber ribbons, in which the lid of a cutting and tension unit is folded up, FIG. 2 is an end view of the cutting and tension unit in FIG. 1, FIG. 3 is a view from above of the stripping device of FIG. 1, in which the lid of the cutting and tension unit is folded down, FIG. 4 is an end view similar to FIG. 2, in which the lid of the cutting and tension unit is folded down, FIG. 7a is a diagram of the temperature of an end portion of a fiber ribbon heated in a heating unit, FIG. 7b is a diagram of the E-modulus of the end portion of the fiber ribbon of FIG. 7a, and FIG. 7c is a schematic view of the end portion of the fiber ribbon of FIGS. 7a and 7b illustrating the position of the diagrams in relation to knifes of the cutting and tension unit.

DETAILED DESCRIPTION

Figure 5:
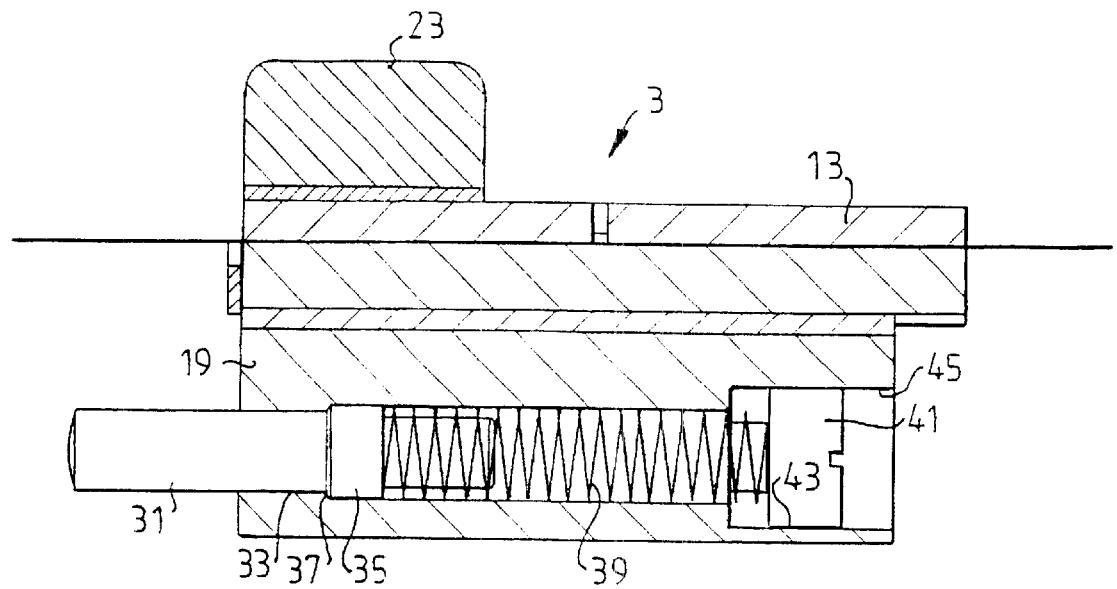
FIG. 5 is a sectional view of the cutting and tension device of FIG. 1 with a fully extended plunger.

In a device for stripping optical fiber ribbons as illustrated in FIGS. 1–4, a heating unit 1 and a cutting and tension unit 3 are shown. The heating unit 1 is a conventional unit and has a heating plate 5, which can be heated to a desired, set temperature. The end of an optical fiber ribbon 7 can be placed to contact the surface of the heating plate 5 and is firmly held in that position by folding a lid 9 down, which will then contact the upper surface of the ribbon end and press it to the heating plate 5. The ribbon is placed to rest in the heating unit located in a position extending from an end surface of the unit up to about the center of the unit. From this end surface of the heating unit two parallel guide rods 11 extend, made as cylindrical pins.

The guide rods 11 extend into corresponding bores in an opposite end surface of the cutting and tension unit 3. Thus the cutting and tension unit 3 can move freely along the guide rods 11 from a position close to the heating unit 1 away to a position distant therefrom through a distance corresponding to somewhat more than the maximum stripping length required for the optical fiber ribbons.

The optical fiber ribbon 7 is also firmly held by the cutting and tension unit 3. For that purpose a fiber ribbon retainer 13 of standard type is used, comprising a base 15 and a lid 17, between which is fiber ribbon 7 is pressed. The retainer 13 is placed in a longitudinal groove in the top surface of the base 19 of the cutting and tension unit 3, so that the fiber ribbon extends in the longitudinal direction of the cutting and tension unit. The retainer 13 is pressed against one side of said groove by spring-loaded balls 21. It is secured in that position by folding a lid 23 down to contact the top surface of the base 19 of the unit. The lid 23 is pressed to that position by a strong permanent magnet 25 arranged in the lid 23 and cooperating with a soft-iron part in the base 19.

At the upper side of the end surface of the base 19 of the cutting and tension unit 3 a sharp knife edge 27 is arranged cooperating with a similar knife edge 29 arranged at the lower side of the corresponding end surface of the lid 23. When folding the lid 23 down, the opposite edges 27, 29 will penetrate into the coating of the fiber ribbon 7.

Figure 6:
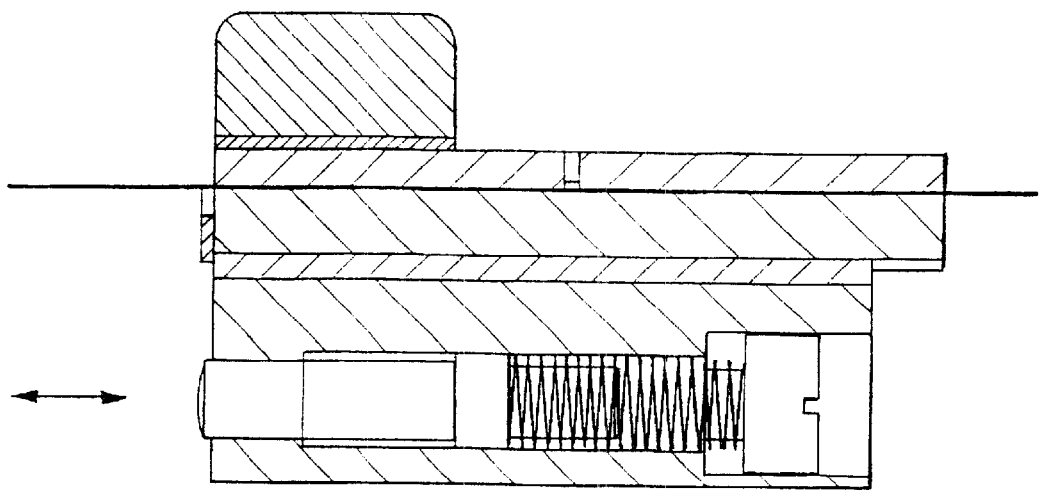
FIG. 6 is a sectional view similar to that of FIG. 5 with a retracted plunger.

An elastically arranged plunger or rod 31 extends from the same end surface of the base 19 of the cutting and tension unit 3. The rod or plunger 31 is a cylindrical body movably mounted in a bore 33 in the base 19, see also FIGS. 5 and 6. The bore 33 extends in the longitudinal direction of the cutting and tension device, in parallel to the fiber ribbon 7 and the guide rods 11, and is located straightly below the ribbon. The rod or plunger 31 has a rear portion 35 with an increased diameter forming a shoulder, which cooperates with a corresponding shoulder 37 in the bore 33. The shoulder 37 in the bore is formed at the connection of a front portion having a smaller diameter adapted to the diameter of the front portion of the plunger 31 to a rear portion of the bore 33 having a larger diameter. In that way the movement of the plunger 31 is restricted so that it can only extend from the base 19 through a predetermined distance.

The plunger or rod 31 is biased to a position having the shoulders engaging each other by a compression spring 39 located in the rear portion of the bore 33 and acting on the rear, inner end surface of the plunger. The tension of the spring 39 is adjusted by a rear support for the spring formed by a screw 41. The screw 41 has a thread 43 on its cylindrical head cooperating with a thread 45 on the inner side of the rear-most portion of the bore 33, which can be widened to have a diameter larger than that space accommodating the main portion of the spring 39. When the screw 41 is screwed further into the bore 33 the tension of or the compressive force exerted by the spring will increase and when it is screwed out of the bore 33 the tension is lowered.

The function of the stripping device will now be described. However, first the general conditions when making a stripping operation will be explained with reference to FIGS. 7a, 7b and 7c. In FIGS. 7a and 7b the temperature and the E-modulus of the polymer coating of the fiber ribbon are illustrated as a function of the position and FIG. 7c is a schematic picture of a ribbon fiber 7 as seen from the side thereof. The position is referenced to the position of the knifes 27, 29 which is shown by the vertical line in FIGS. 7a, 7b, 7c. The knife edges 27, 29 are here assumed to be positioned close to the front end surface of the heating unit 1, at the end of the heating plate 5. The temperature and the E-modulus are plotted for four temperatures $t_1 < t_2 < t_3 < t_4$.

During the heating of a fiber ribbon placed in the heating unit, the polymer material of the coating will be heated and softened gradually, as seen in FIGS. 7a and 7b. However, this process is not uniform over the length of the ribbon fiber inside the heating unit and it will take the longest time until the polymer coating material is heated in the region close to the knifes, since there is much metal material in this region. If the stripping is made too early, before the material has softened enough and the temperature is high enough over the end region which is to be stripped, i.e. for heating times $t < t_2$, the end of the fiber ribbon is destroyed. Instead, if the temperature is sufficiently high and one waits too long before stripping, i.e. for times $t > t_4$, the polymer material is too soft at the knife edges and polymer material which is torn to pieces will still at least partly firmly adhere to the optical fibers in the ribbon. The optimal time for making the stripping operation is about the time $t = t_3$ as shown in FIGS. 7a and 7b. The start of the stripping operation is automatically set by the elastic force derived from the plunger 31 acting on the front end surface of the heating unit 3. Thus, when starting the stripping operation, the cutting and tension unit 3 is positioned directly at the heating unit 1, so that the plunger 31 is fully retracted having no portion extending outside the front end surface of the cutting and tension unit 3.

The different steps when stripping a fiber ribbon are summarized below:

1. The retainer 13 having a fiber ribbon 7 placed therein with a sufficient end portion protruding from the retainer body is placed in the cutting and tension unit 3.
2. The lid 23 of the cutting and tension unit is folded down to firmly hold the retainer 13 and making the knifes 27, 29 cut into the polymer coating of the fiber ribbon.
3. The two parts of the device, the heating unit 1 and the cutting and tension unit 3, are brought into engagement with each other, pressing the plunger 31 into the bore compressing fully the spring 39.
4. The lid 9 of the heating unit 1 is folded down, this movement starting to provide electrical current to the built-in resistance heating elements, not shown, heating the heating plate 5 up to a temperature, which is sensed somewhere at the heating plate.
5. One waits until the force derived from the plunger 31 acting on the heating unit overcomes the adhesive forces binding the polymer coating to the optical fibers, the units 1, 3 then starting to be separated, the polymer coating inside the heating unit 1 being held and remaining therein and being cut off from the rest of the coating remaining on the optical fibers.
6. When the separating movement has been started by the elastic force, the separating movement is continued by manually pulling the units apart.
7. When the units are at some suitable distance, the movement is stopped and the two lids 23, 5 are opened.

The retainer 13 firmly holding the stripped fiber ribbon is removed to be for instance inserted in a cutting device for cutting the optical fibers of the ribbon at right angles. The piece of polymer sleeve in the heating unit is removed.

8. The stripping device is cleaned.

This method of operation works well in the case where the force from the spring 39 is larger than the total adhesive force between the polymer coating over the whole end portion and the enclosed optical fibers within this portion at the set temperature and at the set clamping force. No exact adjustment of temperature and heating time is necessary since the elastic force from the spring will start the stripping movement exactly when the adhesive forces have decreased sufficiently. There is thus no risk for a too extensive heating.

For fiber ribbons having a large adhesion between polymer coating and optical fibers such as fiber ribbons comprising 12 individual fibers, the method of operation can be modified to comprise the following steps including a preliminary stripping of an outermost end portion:

1. The retainer 13 having a fiber ribbon 7 placed therein with a sufficient end portion protruding from the retainer body is placed in the cutting and tension unit 3.
2. The lid 23 of the cutting and tension unit is folded down to firmly hold the retainer 13 and making the knifes 27, 29 cut into the polymer coating of the fiber ribbon.
3. The heating unit 1 and the cutting and tension unit 3 are moved towards each other so that the plunger 31 only contacts the end surface of the heating unit 1.
4. The lid 9 of the heating unit 1 is folded down, this movement automatically starting to provide electrical current to the built-in resistance heating elements, not shown, heating the heating plate 5 up to a set temperature. Then only the outermost end of the fiber ribbon is heated.
5. One waits about 3–5 seconds and then moves the two parts apart manually, stripping the coating from the outermost end of the ribbon.
6. The lid 9 of the heating unit 1 is opened and the heating plate 5 is cleaned.
7. The heating unit 1 and the cutting and tension unit 3 are now brought into engagement with each other, pressing the plunger 31 into the bore fully compressing the spring 39.
8. The lid 9 of the heating unit 1 is folded down again, this movement anew starting to provide electrical current to the built-in resistance heating elements, not shown, heating the heating plate 5 up to the set temperature.
9. One waits until the force derived from the plunger 31 acting on the heating unit overcomes the adhesive forces binding the polymer coating to the optical fibers, the units 1, 3 then starting to be separated, the polymer coating inside the heating unit 1 being held and remaining therein and being cut off from the rest of the coating remaining on the optical fibers.
10. When the separating movement has been started by the elastic force, the separating movement is continued by manually pulling the units apart.
11. When the units are at some suitable distance, the movement is stopped and the two lids 23, 5 are opened.

The retainer 13 firmly holding the stripped fiber ribbon is removed to be for instance inserted in a cutting device for cutting the optical fibers of the ribbon at right angles. The piece of polymer sleeve in the heating unit is removed.

12. The stripping device is cleaned.

What is claimed is:

1. A method of stripping an optical fiber from a polymer coating, the method comprising the steps of:

determining a first portion of the optical fiber located at an end of the fiber which is to be rid of its coating, clamping the fiber at a second portion adjacent the first portion in a cutting and tension unit, pressing knifes onto the polymer coating at a position between the first and second portions, clamping the first portion of the fiber in a heating unit, heating the first portion, moving the cutting and tension unit away from the heating unit, the knifes separating the coating at the first portion from the rest of the optical fiber, leaving an empty polymer sleeve in the heating unit, characterized in that the step of moving the cutting and tension unit is started by only an elastic predetermined force from a spring acting to separate the heating unit and the cutting and tension unit from each other.

2. A device for stripping an optical fiber from a polymer coating, the device comprising:

a heating unit for clamping and heating an outermost first portion of the fiber, a cutting and tension unit for clamping the fiber at a second portion adjacent the first portion, the cutting and tension unit having knifes adapted to be pressed into the polymer coating at a position between the first and second portions, linear guide means arranged to guide the heating unit and the cutting and tension unit in movements towards and away from each other, elastic means acting to move the heating unit and the cutting and tension unit away from each other, characterized in that the elastic means are arranged to act freely on a first unit selected among the heating unit and the cutting and tension unit and only during a start of a movement of the heating unit and the cutting and tension unit from each other up to a first distance between the heating unit and the cutting and tension unit and to allow that the heating unit and the cutting and tension unit are separated from each other by more than the first distance.

3. A device according to claim 2, characterized in that the elastic means comprise an elastically biased rod in a second unit selected among the heating unit and the cutting and tension unit, the rod acting with an end surface freely on a surface of the first unit.

4. A device according to claim 3, characterized in that the guide means comprise cylindrical guide rods attached to and extending from one of the first and second units into matching bores made in the other one of the first and second units.

* * * * *